United States Patent [19]

Major

[11] Patent Number: 5,301,224

[45] Date of Patent: Apr. 5, 1994

[54] MOBILE TELEPHONE WITH LATERAL LOUDSPEAKER

[75] Inventor: Ron Major, Coates, United Kingdom

[73] Assignee: Nokia Mobile Phones (U.K.) Limited, Surrey, United Kingdom

[21] Appl. No.: 98,697

[22] Filed: Jul. 28, 1993

Related U.S. Application Data

[63] Continuation of Ser. No. 937,441, Aug. 27, 1992, abandoned, which is a continuation of Ser. No. 653,781, Feb. 11, 1991, abandoned.

[30] Foreign Application Priority Data

Feb. 20, 1990 [GB] United Kingdom ............... 9003798

[51] Int. Cl.$^5$ .................... H04M 11/00; H04M 1/76
[52] U.S. Cl. .................... 379/58; 379/419; 379/428; 379/432; 379/433; D14/138; D14/252
[58] Field of Search ............ 248/588; 379/58, 419, 379/428, 432, 433, 490, 445, 454, 455; D14/138, 252

[56] References Cited

U.S. PATENT DOCUMENTS

| | | | |
|---|---|---|---|
| D. 135,495 | 4/1943 | Giannini | 379/432 |
| D. 299,719 | 2/1989 | Martensson et al. | D14/138 |
| D. 302,423 | 7/1989 | Martensson et al. | D14/138 |
| D. 316,416 | 4/1991 | Cant et al. | D14/252 |
| D. 319,052 | 8/1991 | Major | D19/138 |
| 3,928,723 | 12/1975 | Kai | 379/432 |
| 4,056,696 | 11/1977 | Meyerle et al. | 379/419 |
| 4,196,319 | 4/1980 | Gates | 379/445 |
| 4,713,836 | 12/1987 | Suzuki | 379/58 |
| 4,741,034 | 4/1988 | Errichiello et al. | 379/455 |
| 4,776,553 | 10/1988 | Kobayashi | 248/588 |
| 4,782,526 | 11/1988 | Uchino et al. | 379/419 |
| 4,797,916 | 1/1989 | Kojima | 379/454 |
| 5,033,709 | 7/1991 | Yuen | 379/454 |
| 5,113,436 | 5/1992 | Jarvela et al. | 379/455 |
| 5,142,573 | 8/1992 | Umezawa | 379/454 |
| 5,189,698 | 2/1993 | Hakanen | 379/455 |

FOREIGN PATENT DOCUMENTS

| | | | |
|---|---|---|---|
| 0250622 | 10/1987 | Fed. Rep. of Germany | 379/454 |
| 2549665 | 1/1985 | France | 379/454 |
| 0161849 | 7/1986 | Japan | 379/454 |
| 0135844 | 5/1990 | Japan | 379/428 |
| 0237345 | 9/1990 | Japan | 379/454 |
| 8601059 | 2/1986 | PCT Int'l Appl. | |

OTHER PUBLICATIONS

Motorola, "DYNA TAC Cellular Mobile Telephone" Mechanical Parts, Aug. 31, 1983.

*Primary Examiner*—Curtis Kuntz
*Assistant Examiner*—William Cumming
*Attorney, Agent, or Firm*—Perman & Green

[57] ABSTRACT

A mobile telephone apparatus for installation in a vehicle comprises a handset and a cradle member for releasably holding and locating the handset. The cradle member includes a loudspeaker grille which, in plan view, is disposed laterally of the handset when the handset is present of the cradle. The handset does not therefore impede the sound from the loudspeaker. The cradle member may be substantially triangular in cross section. The handset can thus be presented to the driver of the vehicle at an optimum angle for easy physical and visual access, without the need for an additional mounting means. Furthermore, the cradle is reversible for left- or right-hand mounting, also allowing horizontal or vertical handset mounting on the dashboard.

20 Claims, 3 Drawing Sheets

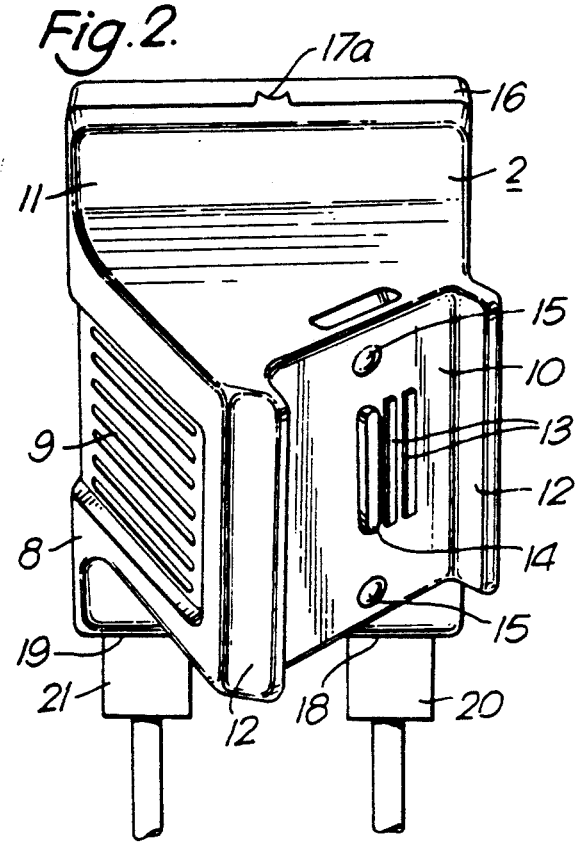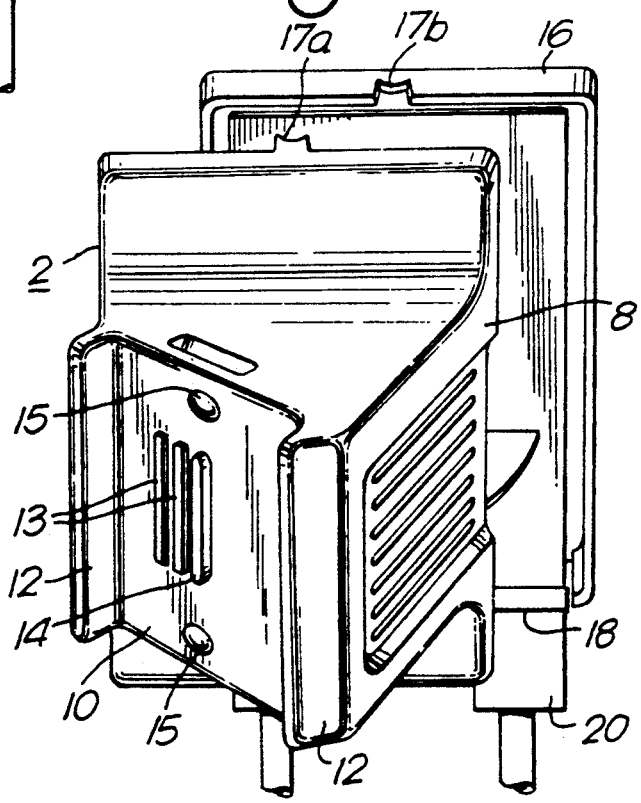

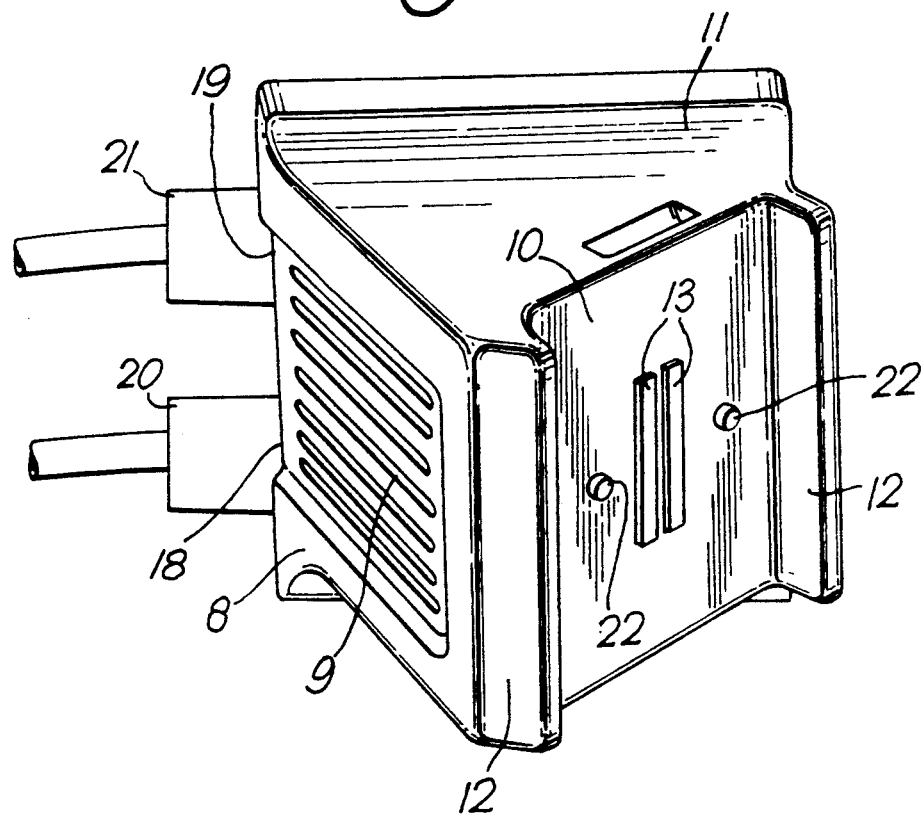

MOBILE TELEPHONE WITH LATERAL LOUDSPEAKER

This is a continuation of copending application Ser. No. 07/937,441 filed on Aug. 27, 1992 now abandoned which is a continuation of copending application Ser. No. 07/653,781 filed on Feb. 11, 1991 now abandoned.

This invention relates to mobile telephone apparatus for a vehicle, comprising an elongate handset and a cradle member for releasably holding and locating the handset.

BACKGROUND OF THE INVENTION

For the sake of safety, mobile telephones are now commonly adapted to operate in the so-called hands-free mode, i.e. without the need to move the handset from the cradle. The driver of the vehicle is thus able to make and receive calls safely without having to physically pick up and hold the handset. The hands-free facility does, however, require the telephone to be equipped with an external microphone located in the vicinity of the user's mouth, and a separate loudspeaker in a fixed position enabling the incoming speech to be heard clearly by the user within the vehicle.

In prior art mobile telephones the hands-free loudspeaker has been mounted integrally within the cradle member behind a grille provided in an external wall thereof.

In a known mobile telephone apparatus, the handset is generally held by the cradle in such a position as to overlie the loudspeaker grille. The cradle is therefore specifically configured to provide a gap between the grille and the handset so that the sound output is not physically blocked. More particularly the face of the cradle member in which the grille is provided may be designed to slope away from the underside of the handset. Nevertheless, the presence of the handset in close proximity above the loudspeaker grille inevitably obstructs the sound from the loudspeaker and therefore reduces efficiency.

Another design consideration in the mobile telephone art is the desirability for the top face of the handset to be inclined towards the driver to facilitate access to the buttons or keys thereon and to permit easier reading of the visual display and indicator lights etc also provided on the top face of the handset. To this end it has been common practice to employ a generally V-shaped "clam shell" bracket incorporating a click stop mechanism. The limbs of the V can be opened at several different angles between −15° and 115°. One limb of the V is fastened e.g. to the central console of the vehicle, and the other limb is fastened to the underside of the cradle member. By opening the clam shell bracket to an appropriate angle the mobile telephone apparatus can be tilted towards the driver. A draw-back of this arrangement however is that a separate mounting bracket is required in addition to the telephone apparatus which thus adds to the overall cost of the equipment and furthermore the bracket itself, by virtue of its functionality, tends to detract from the overall aesthetic qualities of the telephone.

SUMMARY OF THE INVENTION

According to the present invention there is provided a mobile telephone apparatus for a vehicle, comprising an elongate handset, and a cradle member; said cradle member including means for releasably holding and locating the handset, and a loudspeaker grille disposed laterally of the handset when the handset is located on the cradle.

A mobile telephone apparatus in accordance with the invention has the advantage that the handset, when mounted on the cradle member, does not cover or overlie the loudspeaker at all. On the contrary, the loudspeaker grille remains completely exposed and unobstructed even when the handset is in place on the cradle member. The handset does not therefore obstruct the sound output and the effectiveness of the loudspeaker is unimpaired.

Preferably, the loudspeaker grille is provided in a first face of the cradle member, and the means for holding and locating the handset are provided in a second face, the first face being inclined relative to the second face.

The cradle member may also comprise a base portion from which the first and second faces extend in converging relationship.

This configuration has the advantage that the cradle can be designed to present the handset to the driver with the appropriate degree of tilt for easy physical and visual access, without the need for an additional mounting bracket. Furthermore, this cradle is eminently suitable for mounting on the center console, on the dashboard, or indeed in any other convenient location in the vehicle.

Suitably the cradle member is substantially triangular in section through the first and second faces and the base portion.

This has the advantage that the cradle may have a particularly compact form. Alternatively, for example, the cross-section of the cradle member may be trapezoidal.

In order to ensure correct positioning of the handset on the cradle, the holding means and the handset may be provided with respective complementary locating features.

Preferably, the locating features are adapted to hold the handset in two alternative positions in the same plane, the two positions being mutually oriented through 180°.

This has the significant advantage that the cradle member enables reversible right- or left-hand mounting. That is to say the cradle can equally be used in left- or right-hand drive cars without modification.

BRIEF DESCRIPTION OF THE DRAWINGS

Embodiments of the invention will now be described, by way of example, with reference to the accompanying drawings, in which:

FIG. 2 is a perspective view of the cradle member in FIG. 1, FIG. 3 is a perspective view of the cradle member in FIG. 2 in a different orientation, and FIG. 4 is a perspective view of an alternative cradle member.

DETAILED DESCRIPTION OF THE INVENTION

Figure 1:
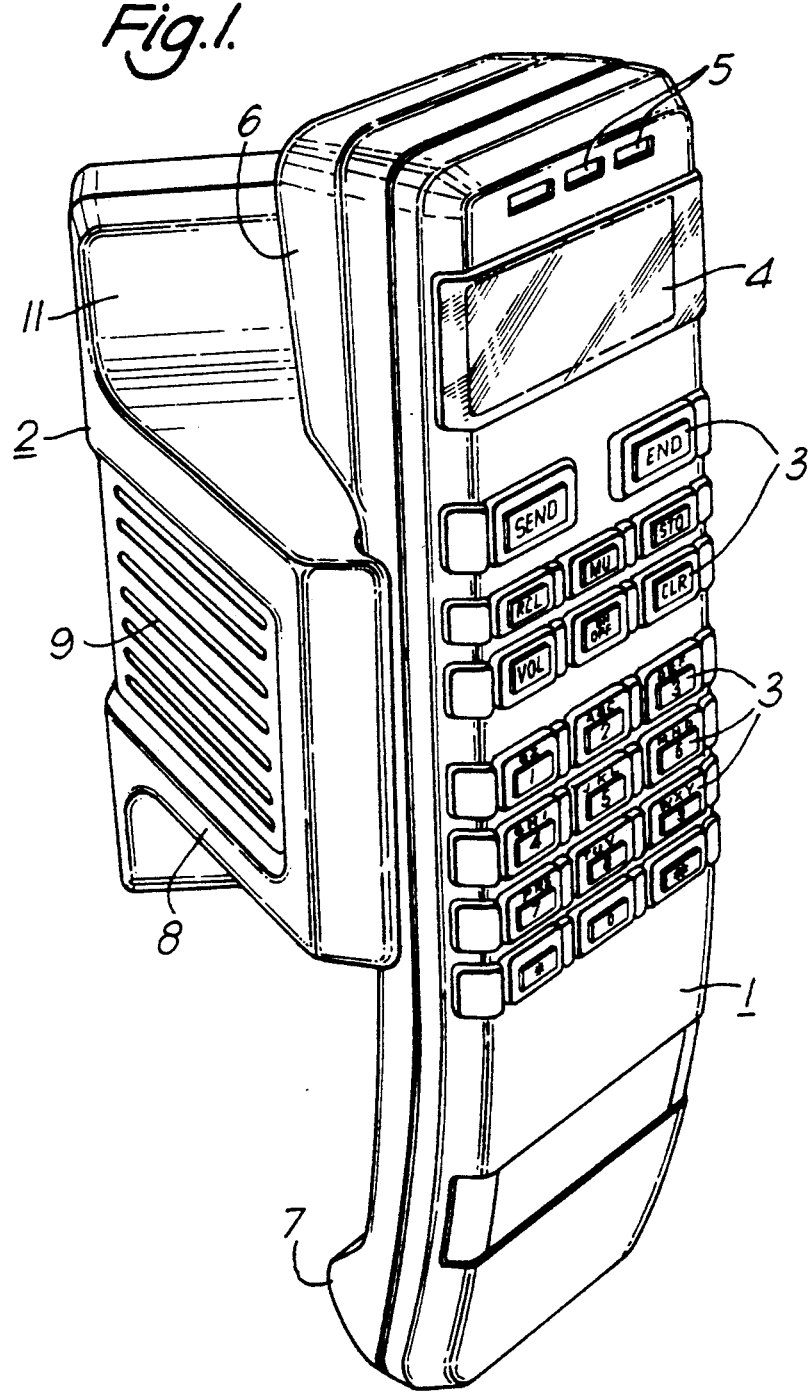
FIG. 1 is a perspective view of a mobile telephone apparatus comprising a handset and a cradle member in accordance with the invention.

The mobile telephone apparatus shown in FIG. 1 comprises a generally elongate handset 1 mounted in a readily releasable manner on a cradle 2. As is conventional the handset comprises on its outward face a plurality of buttons or keys 3, a display panel 4, and a plurality of indicator lights 5. The handset 2 also comprises an earpiece 6 enclosing an earphone, and a mouthpiece 7 enclosing a microphone.

Referring also to FIG. 2, the cradle housing member 2 comprises a face 8 in which is provided a grille 9, a face 10 against which the handset 1 is held (as described in more detail below), and a base portion 11. A loudspeaker is mounted inside the cradle 2 behind the grille in conventional manner.

The base portion 11 is substantially flat, and the faces 8 and 10 extend from the base in converging relationship. Thus the cradle member 2 is substantially triangular in section through the faces 8 and 10 and the base portion 11. The respective angles between the faces 8 and 10, and the base portion 11 may of course be varied as desired. In the symmetrical arrangement shown these angles are the same. However in an asymmetric configuration, the face 8 may be more steeply inclined with respect to the base portion 11 than the face 10. In an alternative arrangement the face 10 could be more steeply sloping than the face 8. In the embodiment shown the face 10 and the face 8 are both inclined at 42.5° to the base portion 11.

The face 10 has an integral flange 12 at each side thereof, extending vertically as shown in FIG. 2. The flanges 12 are spaced apart so as to receive the handset snugly therebetween, as illustrated in FIG. 1. The flanges 12 thus prevent the handset 1 from moving laterally.

The face 10 of the cradle 2 is provided with a conventional magnetic catch comprising a pair of protruding magnetic strips 13. A complementary metallic strip (or pair of strips) is provided on the underside of the handset 1 to hold the handset 1 in place when it is located in the cradle.

The face 10 of the cradle 2 is also provided with a feature in the form of a central upstanding rib 14 for locating the handset 1. To this end the handset 1 is provided with a complementary recess on its underside. When the rib 14 on the cradle 2 locates in the complementary recess in the handset 1, the metal strip (or strips) on the handset are aligned with the magnetic strips 13 on the cradle 2.

To visually assist the user to locate the handset in the cradle, especially in the dark, the face 10 of the cradle 2 may be provided with two indicator lights 15 disposed centrally one above the other.

The cradle 2 in this embodiment is in the form of a two piece-unit, viz. the front part comprising the faces 8 and 10, and base portion 11 already described; and a back part in the form of a tray-like member 16. The front and back parts are provided with a snap-fit mechanism 17a, 17b by means of which the two parts can be readily separated and fastened back together again by the user. The back part 16 may be provided with holes, e.g. having an internal screw thread, by which the cradle may be fastened to a suitable anchorage point in a vehicle, typically to the central console or to the dashboard. In the case of dashboard mounting the cradle may be oriented so that the handset is either vertical or horizontal.

The back member 16 is also provided with a pair of sockets 18, 19 on the lower side of the cradle (as illustrated in the Figures) for receiving a respective connector 20,21 having leads extending respectively to the handset 1 and to the transceiver of the telephone. The transceiver is not illustrated in the Figures and is not described further because it does not form part of the invention. The cradle 2 may contain appropriate circuitry, again not shown, since this too forms no part of the present invention.

As shown in FIG. 3, the front part of the cradle 2 may be opened and rotated through 180° and then snapped back on to the back part 16. This reverses the handset mounting from right hand (as shown in FIGS. 1 and 2) to left hand as illustrated in FIG. 3. This reversible cradle is thus suitable for mounting in either left- or right-hand drive cars without the need for any further mounting means.

In order for compatibility between the handset and the cradle in its reversed position, the underside of the handset is provided with a second metallic strip (or pair of strips) to cooperate with the magnetic strips 13 on the cradle in its reversed position.

With reference to FIG. 4 there is illustrated an alternative one-piece cradle 2 in accordance with the present invention. In this case t he sockets 18, 19 for connectors 20, 21 are provided at one side of the cradle 2 so that when the cradle is reversed the side from which the connectors extend is also reversed. Preferably the sockets are provided in the base portion 16 adjacent the face 8 in which the loudspeaker grille is provided. This arrangement has the benefit that the connectors and their leads do not foul the area around the handset which could make it more difficult for the user to remove or replace the handset 1 on the cradle 2.

The cradle in this embodiment further has a symmetric magnetic catch and locating features. The magnetic strips 13 are in this case centrally located on face 10, while the locating features are in the form of two short protruding posts 22 disposed symmetrically one on each side of the magnetic catch 13. In this case only a single centrally located metallic strip is required on the underside of the handset. A pair of complementary recesses for the posts is also provided on the underside of the handset 1. This simplified arrangement enables the handset to be placed on the cradle in either the left or right hand mounting positions.

In view of the foregoing description it will be evident to a person skilled in the art that various modifications may be made within the scope of the present invention. For example, the cross-section of the cradle need not be triangular but may instead, for example, be trapezoidal, that is to say the cradle member may have a plateau region, e.g. parallel to the base, between the two sloping faces.

I claim:

1. Mobile telephone apparatus for a vehicle comprising a telephone with an elongate handset, and a cradle member having means for mounting to the vehicle in two reversible orientations; said cradle member including means for releasably holding and locating the handset in a generally vertically oriented upright position in both of said reversible mounting orientations, and a loudspeaker grille disposed laterally of the handset when the handset is located on the cradle.

2. A mobile telephone as claimed in claim 1, wherein the loudspeaker grille is provided in a first face of the cradle member, and the means for holding and locating the handset are provided in a second face, the first face being inclined relative to the second face.

3. A mobile telephone as claimed in claim 2, wherein the holding and locating means are adapted to hold the handset in both of said reversible mounting orientations such that the longitudinal axis of the handset is substantially parallel to the line of intersection of the first and second faces.

4. A mobile telephone as claimed in claim 2, wherein the cradle member comprises a base portion from which the first and second faces extend in converging relationship.

5. A mobile telephone as claimed in claim 4, wherein the cradle member is substantially triangular in section through the first and second faces and the base portion.

6. A mobile telephone as claimed in claim 1, wherein the holding means and the handset are provided with respective complementary locating means.

7. A mobile telephone as claimed in claim 6, wherein the locating means are adapted to hold the handset in two alternative positions in the same plane, one in each of said reversible mounting orientations, the two positions being mutually oriented through 180°.

8. A mobile telephone as claimed in claim 2, wherein at least one end of the handset overhangs the second face of the cradle member.

9. A mobile telephone as claimed in claim 8, wherein opposite ends of the handset overhang respective opposite edges of the second face of the cradle member.

10. A mobile telephone as claimed in claim 3, wherein the cradle member comprises a base portion from which the first and second faces extend in converging relationship.

11. A mobile telephone as claimed in claim 10, wherein the cradle member is substantially triangular in section through the first and second faces and the base portion.

12. A mobile telephone as claimed in claim 11, wherein the holding means and the handset are provided with respective complementary locating means.

13. A mobile telephone as claimed in claim 12, wherein the locating means are adapted to hold the handset in two alternative positions in the same plane, one in each of said reversible orientations, the two positions being mutually oriented through 180°.

14. A mobile telephone as claimed in claim 13, wherein at least one end of the handset overhangs the second face of the cradle member.

15. A mobile telephone as claimed in claim 14, wherein opposite ends of the handset overhang respective opposite edges of the second face of the cradle member.

16. Mobile telephone apparatus for installation in a vehicle, comprising telephone with a generally elongate handset, and a cradle member having means for mounting to the vehicle in two reversible orientations; said cradle member having means for releasably holding and locating said hand in an upright position with an earpiece and a mouthpiece of the handset being located in a single handset positional orientation in the vehicle in both of said reversible mounting orientations of the cradle member, and a loudspeaker grille, said loudspeaker grille, as seen in plan view, being disposed laterally of the handset when the handset is located on the cradle.

17. A mobile telephone as claimed in claim 16, wherein the loudspeaker grille is provided in a first face of the cradle member, and the means for holding and locating the handset are provided in a second face, the first face being inclined relative to the second face.

18. A mobile telephone as claimed in claim 17, wherein the cradle member includes illumination means for indicating the area for locating the handset when the handset is detached from the cradle.

19. A mobile telephone apparatus comprising:
a telephone with an elongate handset; and
a cradle having means for mounting in two reversed orientations, the cradle having means for releasably locating and holding the handset in a generally vertically orientated upright position in both of the reversed orientations, the cradle further comprising a loudspeaker grille disposed laterally of the handset when the handset is mounted on the cradle.

20. A mounting cradle for a vehicle mobile telephone apparatus, the cradle comprising:
means for connecting the cradle to a vehicle in either one of two reverse positions;
a handset receiving area having means to releasably locate and hold a handset of the apparatus in a substantially upright position and with a single positional orientation of an earpiece and mouthpiece of the handset when the cradle is in either one of the two reverse positions; and
a loudspeaker grille facing a substantially lateral direction relative to the handset receiving area.

* * * * *